INVENTOR.
Rudolf Styner

INVENTOR.
Rudolf Styner

FIG.14

United States Patent Office

3,331,553
Patented July 18, 1967

3,331,553
CALCULATING AND INDICATING DEVICE,
PARTICULARLY FOR A CASH REGISTER
Rudolf Styner, Frauenkappelen, Switzerland, assignor to Styner & Bienz AG, Niederwangen, Switzerland
Filed Sept. 30, 1965, Ser. No. 491,790
Claims priority, application Switzerland, Feb. 17, 1965, 2,183/65
12 Claims. (Cl. 235—23)

This invention relates to a calculating and indicating device, particularly for a cash register.

In cash registers and similar apparatus comprising a calculating and indicating device it is desired that the indicating device remains in its indicating position between succeeding operating cycles of the machine. In order to meet with this requirement it was usual in prior cash registers or the like to periodically disengage the indicating device from the adjusting mechanism. This requires a relatively complicated mechanism and complicated machine operations.

It is a primary object of this invention to avoid disengagement of the indicating device from the rest of the mechanism and thereby to simplify the calculating and indicating mechanisms. The calculating and indicating device according to this invention broadly comprises stop bars adapted for adjustment to positions determined by stops of a keyboard, at least one indicating device and one calculating device operable by said stop bars, said stop bars being continuously coupled with numeral wheels of the indicating device and said stop bars remaining in the indicating position of the last operating cycle of the machine between succeeding operating cycles of the machine. No disengageable coupling is thus required between the stop bars and the numeral wheels of the indicating device. In order to allow adjustment of the stop bars and of the numeral wheels at a high speed without a separate elastic coupling between the stop bars and the numeral wheels, the pinions of the numeral wheels gearing with toothed racks of the adjusting bars may be connected with the cylindrical numeral carrier by elastical spokes.

Since the stop bars are brought into their new position determined by the stops of depressed keys of the keyboard at the end of each operating cycle and the stop bars remain in this position between succeeding operating cycles of the machine, adding of entered items into the calculating register has to be effected during the first phase of the next operating cycle. Therefore, suitable preselecting means have to be provided allowing preselection of a new calculating operation without cancelling the previous adjustment so that during the next operating cycle the previously adjusted calculating operation is effected during the first phase and the new calculating operation may be effected during a later phase of the operating cycle.

In order to prevent recoil of the stop bars and numeral wheels coupled therewith when arriving in the adjusting position, adjustable recoil means may be engaged with the stop bars during the advancing and adjusting movement thereof for preventing any return motion thereof from the end position determined by a key stop or an end stop when no key is depressed.

Other objects and features important in connection with the above general object of this invention will be explained with reference to the attached drawing showing, by way of example, one embodiment of a cash register according to this invention.

The frame of the cash register has a base plate 1 and two vertical side plates 2 and 3. The mechanism of the machine being mounted on the side plates 2 and 3. The motor 4 is mounted on plate 2 and its shaft projecting through an opening of plate 2 carries a pinion 6 continuously gearing with a wheel 5. The wheel 5 is rotatably mounted on the shaft of a pinion 7 and is coupled with the pinion by means of a friction coupling formed by a star spring 8. Pinion 7 gears with a wheel 9 fixed on the main cam shaft 10 pivoted in side walls 2 and 3. The wheel 9 also gears with a wheel 11 pivotally mounted together with a crank hub 12 on a shaft 13 riveted to the side plate 2. The transmission ration between wheels 9 and 11 is 1:2. A crank not shown in the drawing may removably be applied to the hub 12 for crank operation of the machine in case of failure of the motor 4.

A four-armed lever 14 is pivotably mounted on shaft 12. Arm 14a of this lever 14 has a pin 15 of insulating material projecting through an aperture of plate 2. When the lever 14 is in its rest position shown in the drawings, pin 5 maintains a first contact 16 spaced from a second contact 17 of a motor switch so that the motor is deenergized. A second arm 14b of lever 14 has an end surface contacting an end stop 18 of the wheel 9. A third arm 14c of lever 14 has an inclined control surface 19 adapted to be engaged in a manner explained below by a similarly inclined control surface 20 of a laterally projecting part of wheel 9. The fourth arm 14d of lever 14 has a latch tooth 21 adapted for cooperation with the latch tooth 22 of a lever 24 pivoted on a shaft 23. The start key 25 is fixed on lever 24. A tension spring 26 is attached to arm 14d of lever 14 and lever 24, this spring tending to rotate both levers in anticlockwise direction.

The driving mechanism shown in FIGS. 1 and 2 operates as follows: As explained above, the motor circuit is opened at switch 16, 17. When the start key 25 is depressed and lever 24 is pivoted downwardly, tooth 21 of lever arm 14d engages behind tooth 22 of lever 24 whereby the lever 24 is locked in its lower operative position. Due to the locking movement of the lever 14 arm 14b is displaced from the rotation path of end stop 18. Further, the motor switch 16, 17 is closed due to the upward displacement of pin 15, so that the motor 4 is started whereby wheel 9 is driven in anticlockwise direction through pinion 6, wheel 5, coupling 8 and pinion 7. When the wheel 9 has executed nearly one full rotation the control surface 20 engages the control surface 19 of lever arm 14c and swings the lever 14 back beyond its rest position shown in the drawing, whereby the latch tooth 21 releases the latch tooth 22 so that lever 24 eventually returns into its rest position. When the control surface 20 releases the control surface 19 lever 14 returns into the rest position shown in the drawing because its latch tooth 21 engages the outer side surface of latch tooth 22 of lever 24, whereby the lever arm 14b returns into the rotating path of end stop 18 and limits the rotation of wheel 9 to exactly one full rotation. When the lever 14 is first swung back in clockwise direction switch 16, 17 is opened and the motor circuit is deenergized. The motor has sufficient kinetic energy for completing the rotation of wheel 9 and cam shaft 10 after opening the motor switch. While wheel 9 executes one full rotation, wheel 11 makes two full rotations. Upon failure of the motor 4 the mechanism may be operated from wheel 11 by means of a hand crank.

Figure 6:
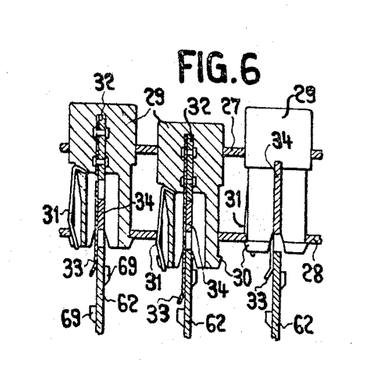
FIG. 6 is a section along line VI—VI in FIG. 5.

The key board of the cash register is mounted in two parallel plates 27 and 28 connected to each other and to the side plates 2 and 3 of the frame in a manner well known in the art and not shown in detail in the drawing. The keys 29 are slidably held in openings of plates 27 and 28 and are anchored in the keyboard by beads 30. A wire spring 31 is inserted into a groove of each key for maintaining the key in its upper inoperative or in its lower operative position as shown in FIG. 6. A control lug 32 is held in the head of each key 29 and a springy stop tongue 33 is riveted to each of the control lugs. The lower hollow portion of the keys has a diametral slit for accommodation of a control bar 34 associated to all keys of one decimal. The control bar 34 is guided by the keys and the control bar prevents rotation of the keys. The control bar 34 is slidably supported on the lower plate 28 of the keyboard.

Figure 5:
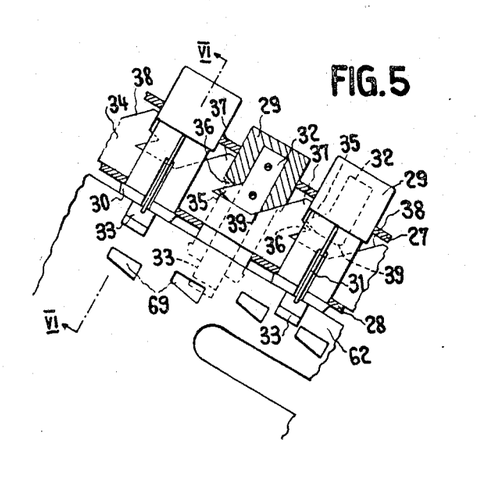
FIG. 5 is a part of FIG. 4 on a larger scale.

As shown in FIG. 5 the control lugs 32 of the keys 29 have a tooth 35. When a key is depressed as shown in FIG. 5, a tooth 36 of tongues 37 of the control bar 34 is engaged between the tooth 35 and the key head. The tongues 37 of the control bar 34 have control surfaces 38 adapted to be engaged by an inclined corner surface 39 of a control lug of each key for shifting the control bar downwards toward the right into the operative locking position shown in FIG. 5. When the control bar is in this locking position, its teeth 36 engage below the teeth 35 of the keys which have not been depressed, and such keys are locked in their upper inoperative position. This locking mechanism prevents successive operation of more than one key in one decimal.

The lower end of each control bar 34 has a hook 40 engaging into a window 41 of a release bar 42. By means of side portions 43 and 44 the release bar 42 is pivoted on a shaft 45. The position of lever portion 44 is determined by a tension spring 244 applying the end of lever 44 towards a cam 344 of the main cam shaft 10. Leaf springs 46 engaging into the windows 41 are riveted to the release bar 42, such leaf springs acting onto the hooks 40 of the control bars 34 thereby tending to shift such control bars upwardly. The lever 43 is pivotably connected to a lever 47 of which the one fork-shaped end encloses a bar 48 and of which the other end is located below the shaft 49 of a correction key 50. The correction key 50 is usually maintained in its inoperative upper position shown in FIG. 4 by a spring 51.

Figures 4, 7:
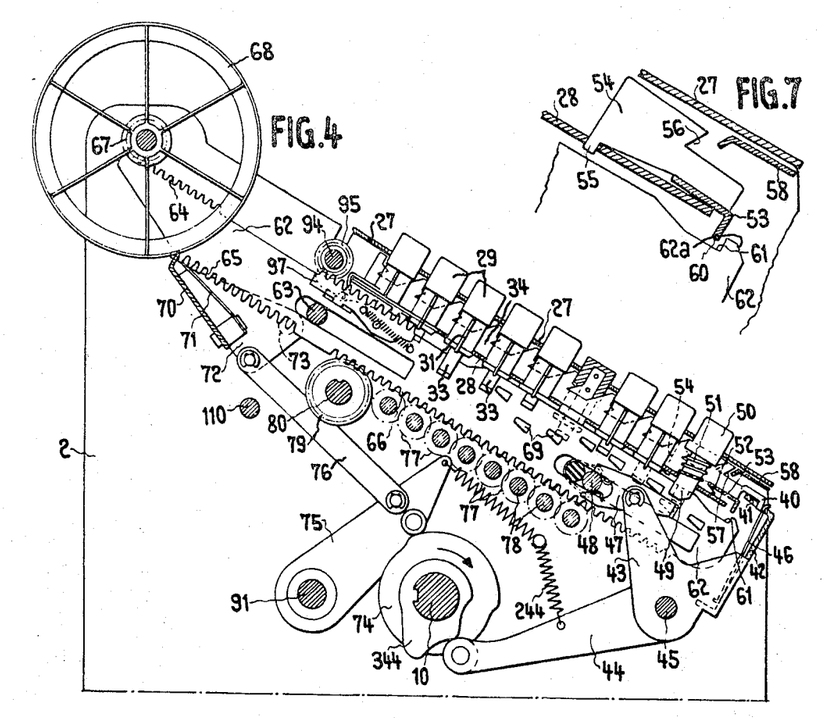
FIG. 4 is a section along line IV—IV in FIG. 3.
FIG. 7 shows a detail not shown in FIG. 4.

An inclined actuating surface 52 is provided at the lower end of each control bar 34, such actuating surfaces being adapted to engage below the web 53 of zero stops and to lift such zero stops (FIGS. 4 and 7). The web 53 of each zero stop interconnects two side walls 54 having projections 55 engaging into openings of the lower key-board plate 28 whereby the zero stops are pivotably mounted between the key-board plates 27 and 28 but shifting parallel to plates 27 and 28 is prevented. The side portions 54 of the zero stops have inclined control surfaces 56. The control bars 34 have corresponding inclined control surfaces 57. The surfaces 56 and 57 are in the operating range of a control slide 58 slidably mounted on the upper key-board plate 27. The slide 58 is mounted by means of rivets passing through oblong holes or slits 59 of the slide 58 so that this slide may be displaced in a direction parallel to its oblong holes or slits 59.

Downwardly extending stop lugs 60 of the zero stops 53 engage into notches 61 of the associated stop bar 62 when the zero stop is in its operative rest position shown in FIG. 7. The stop bars 62 are slidably mounted on shafts 48 and 63. Each of the stop bars has toothed racks 64, 65 and 66, the distance between neighbouring teeth of each rack corresponding to one unit step of the stop bar. The toothed rack 64 gears with the pinion 67 of an indicating numeral wheel 68 carrying numerals 0 to 9 in a manner well known in the art. The stop bars 62 have stops 69 formed by bar material pressed outwardly, the stop tongues 33 being disposed on both sides of the stop bars for cooperation with stops at both sides of the stop bars. A recoil stop comprising a plate 70 and a leaf spring 71 is disposed below the toothed racks 65 of the stop bars. The plate 70 and the leaf spring 71 connected thereto are pivoted round shafts 73 and the swinging of the recoil stop round shafts 73 for engaging and disengaging it from the racks 65 is controlled from a cam disc 74 of the cam shaft 10 through a lever 75 and a transmission rod 76. The toothed racks 66 of the stop bars 62 gear with pinions 77 fixed on shafts 78 for transmitting the displacements and positions of the stop bars 62 to a second indicating device, to a printing device or any other device not shown in the drawing. Each of the toothed racks 66 further gears with a driving pinion 79 mounted on a driving shaft 80.

Figure 12:
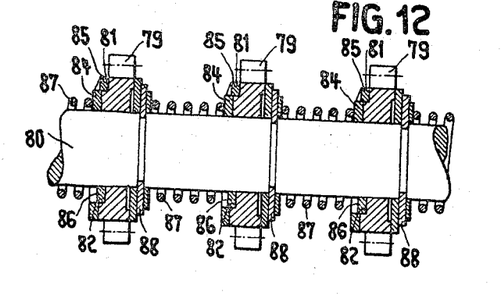
FIG. 12 is a partial section on a larger scale through the driving shaft of the stop bars.
Figure 13:
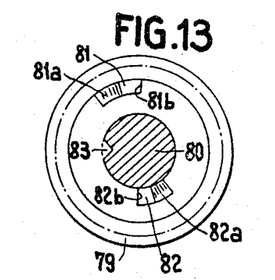
FIG. 13 shows a driving pinion of the driving shaft in side view and FIG. 14 is a timing diagram.

The design of the driving pinions 79 and the elements cooperating therewith is shown in FIGS. 12 and 13. As shown in FIG. 13 the driving pinions 79 preferably made of synthetic resin have two diametrally opposite recesses 81 and 82 at one face thereof, each of said recesses having an inclined end surface 81a and 82a respectively and a radial end surface 81b and 82b respectively. A disc 84 having a cam (not shown) engaging into the groove 83 of the driving shaft 80 is mounted adjacent the said one face having recesses 81 and 82 of each driving pinion, this disc 84 having axially projecting driving cams 85 and 86 adapted for engagement into the recesses 81 and 82 of the driving pinion. The discs 84 are pressed against the driving pinions by means of pressure springs 87. The driving pinions are secured against axial displacement by means of spring rings 88. Discs are supported on rings 88 for supporting the driving pinions 79 and the pressure springs 87 respectively. The driving shaft 80 is driven by means of a toothed segment 90 gearing with a pinion fixed on shaft 80. The toothed segment 90 is pivoted on a shaft 91 and is actuated by a roller 92 contacting a cam disc 93 of the main cam shaft 10. The return stroke of the toothed segment 90 is controlled by a tension spring 94.

Figure 8:
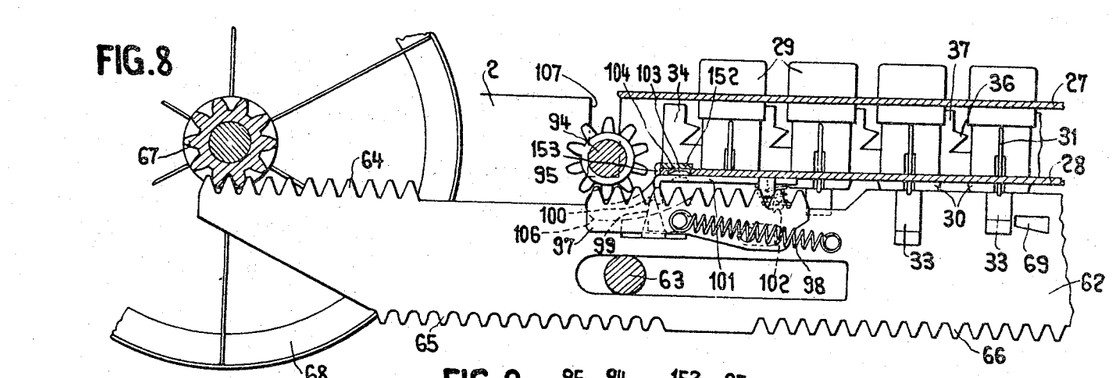
FIG. 8 is another portion of FIG. 4 on a larger scale.
Figures 9, 10:
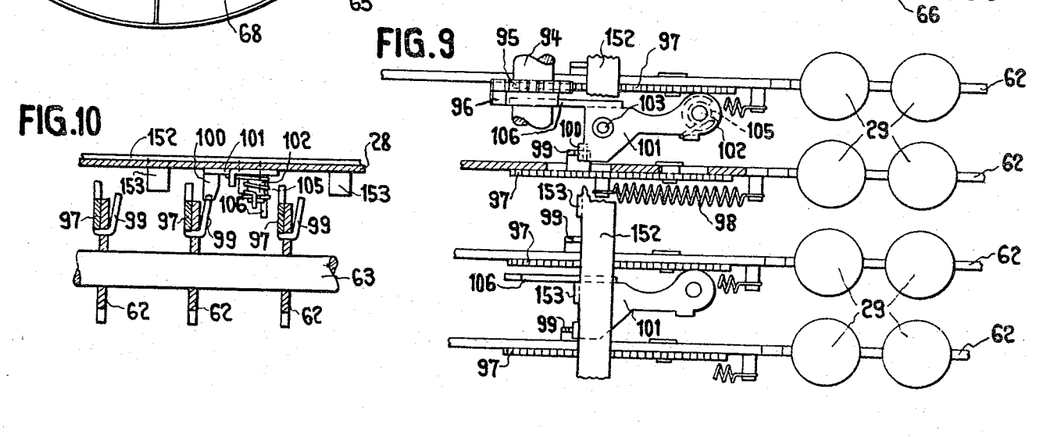
FIG. 9 is a top view, partially in section of the ten-transmitting mechanism.
FIG. 10 is a cross section of the ten-transmitting mechanism.

The calculating register comprises a number of counting wheels 95 rotatably mounted but axially secured on a shaft 94. Each of the counting wheels 95 has nine narrow teeth and an axially wider tooth 96. In the rest position of the cash register shown in the drawing each of the counting wheels 95 gears with an auxiliary toothed rack 97 displaceably mounted on the associated stop bar in the longitudinal or adjusting direction of the stop bar 62. A tension spring 98 acting between the stop bar 62 and the associated toothed rack 97 tends to maintain the toothed rack 97 in a lower, right-hand end position (FIGS. 4 and 8) determined by a stop formed by the guiding means for the toothed rack on the stop bar. As shown in FIGS. 8 and 9, the one guiding extension of each toothed rack 97 forms a stop tooth 99, and a stop lug 100 of a stop latch 101 usually projects into the path of the stop tooth 99. The stop latch 101 is pivotably mounted with axial clearance on the lower key-board plate 28 by means of a rivet 102 so that the latch may be pivoted on and lifted off the key-board plate 28. The stop latch 101 has an upwardly extending rest 103 usually engaging into a rest aperature 104 of the lower key-board plate 28 for determining the rest position of the latch. A spring 105 acts onto the stop latch 101 for simultaneously urging the latch towards the plate 28 and tending to swing the latch 101 in anticlockwise direction in FIG. 9. The stop latch 101 has an arm 106 with a tooth-shaped end extending into the rotating path of the axially wider tooth 96 of the associated counting wheel 95. When the counting wheel rotates in anticlockwise direction (FIG. 8) the tooth-shaped end of arm 106 is engaged by the tooth 96 of the counting wheel, whereby the stop latch 101 is displaced downwardly and its rest 103 is disengaged so that the stop latch 101 may be swung in anticlockwise direction and its stop lug 100 is removed from the path of the stop tooth 99 of the toothed rack 97 of the higher decimal. In a manner explained later on the stop latch 101 serves for ten transmission.

The crank hub 12 is formed in one piece with a bell cam 147 operatively engaging the one end of a two-armed lever 150 pivoted at 148 and loaded by a spring 149. A finger 151 of lever 150 engages into an opening of a slide 152. As seen in FIGS. 8 to 10 the slide 152 extends across all stop latches 101 and it has downwardly extending lugs 153 engaging the arms 106 of the stop latches 101 (FIG. 9) when the parts are in the rest position shown in the drawings. The stop latches are thus maintained in their inoperative position illustrated in the drawings when the machine is in its rest position, but the lugs 153 are spaced from the stop latches 101 when the higher portion of cam 147 engages the lever 150 and when the slide 152 is displaced downwards (FIG. 9), so that the stop latches 101 are free to swing to their operative position as explained above.

The shaft 94 of the counting register is maintained in parallel slits of plates 2 and 3, only the slit 107 in plate 2 being shown in the drawings. The position of the shaft in these slits is determined by the forks 108 of two levers pivoted inside the side plates 2 and 3 on a shaft 110. The position of lever 109 is determined on one hand by the pull of a spring 111 and on the other hand by the position of a fork-shaped lever 112 pivotably connected to lever 109. The position of lever 112 is usually determined by engagement of a pin 113 into the rest 114 of a control lever 116 loaded by a tension spring 115. The control lever 116 is pivotably connected to an actuating or driving lever 117 operated in a manner explained below.

The fork-shaped lever 112 has stop surfaces 118 and 119 at the ends of its arms, such stop surfaces being spaced from the arms of the lever by notches 120 and 121. The stop surfaces 118 and 119 are adapted for cooperation with stop lugs 122 and 123 of a lever 124 pivoted on shaft 91. The position and displacement of the lever 124 is controlled by a roller 126 contacting a cam disc 127 of the main cam shaft 10 under the action of a spring 125.

At its end extending from the upper key-board plate 27 from a casing cover not shown in the drawing, the lever 117 has a pointer 128 indicating the lever position on the scale comprising positions C*XZ. The lever 117 extends through a slit of a slide 129 guided by means of rivets 130. The slide 129 has a control slot 131 receiving the control pin 132 of a schematically illustrated lock 133. The slide 129 has a rest toothing 134 into which engages the rest finger 135 of a locking rod 136. The locking rod 136 is maintained in engagement with the rest toothing 134 of the slide 129 by means of a spring wire 138 contacting a finger 137 of the rod 136. The slide 129 has an upwardly extending lug 139 contacting the control surface 140 of a lever 143 pivotably mounted by means of a rivet 141 and loaded by a spring 142. The lever 143 has a notch 144 adapted for receiving the lug 139 of slide 129. The lever 143 is coupled with the slide 58 by means of a rod 145. The lock 133 has a second pin 132a for actuating the locking rod 136.

Figure 1:
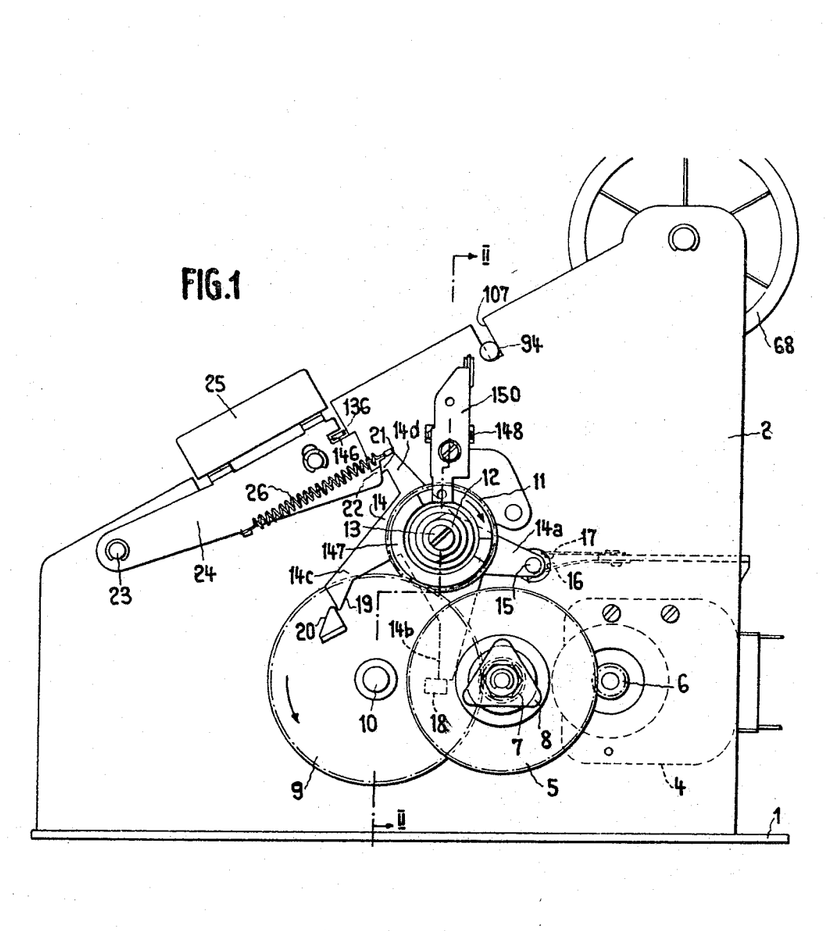
FIG. 1 is a side view of the cash register without its casing.
Figure 2:
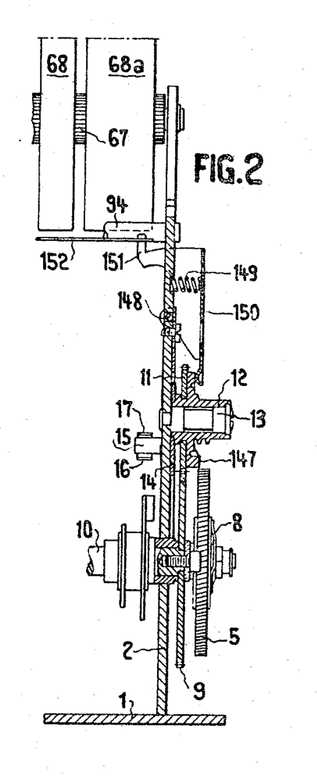
FIG. 2 is a section of the driving mechanism along line II—II in FIG. 1.

As shown in FIG. 1 the one end of the locking rod 136 faces a recess 146 of the start lever 24. When the locking rod 136 is shifted to the right from its rest position by disengagement of its finger 135 from a tooth space of the rest toothing 134 or by operation of the locking rod by the lock pin 132a, the locking rod engages into the recess 146 of the lever 24 whereby the start key is locked in its inoperative position and the cash register cannot be operated.

The indicating device of the cash register has a first wide indicating wheel 68a serving for indication of letters or other references. A second axially wider indicating wheel 68b belongs to both parts of the indicating device and carries two rows of numerals.

The drawing shows the cash register in its rest position and adjusted for item addition or entry into the calculating register. Preselection of the type of operation of the machine may be effected exclusively by rotation of the lock 133 whereby the slide 129 is shifted according to the displacement of the lock by the pin 132 of the lock engaging the groove 131 of the slide 132, whereby the lever 117 coupled with the slide 129 is adjusted accordingly. The pointer 128 of the lever 117 points to position (*) characterizing the item-adding position. The lever 112 is maintained in the position shown in FIG. 11 by the rest 114 of lever 116. As shown in the timing diagram of FIG. 14 the release bar 42 is in an intermediate position for which the control bars 34 are maintained in their inoperative upper end position by springs 46, for which end position the keys 29 may be depressed. As indicated in FIGS. 4 to 6, any desired key may now be actuated in each decimal. When a key is depressed its control surface 39 engages the control surface 38 of the associated control bar 34 whereby this control bar is shifted into its lower position shown in FIGS. 4 and 5 whereby the spring 46 is bent back. The depressed key is locked in its depressed position by the tooth 36 of the control bar 34, whereas the other teeth 36 of the control bar 34 engage below the teeth 35 of the keys remaining in their rest position and prevent subsequent operation of such keys. It is thus impossible that more than one key may be operated subsequently in the same decimal. Upon shifting each control bar 34 engages below the web 53 of the associated zero stop with its control and this zero stop is lifted into its inoperative position shown in FIG. 4.

Figure 11:
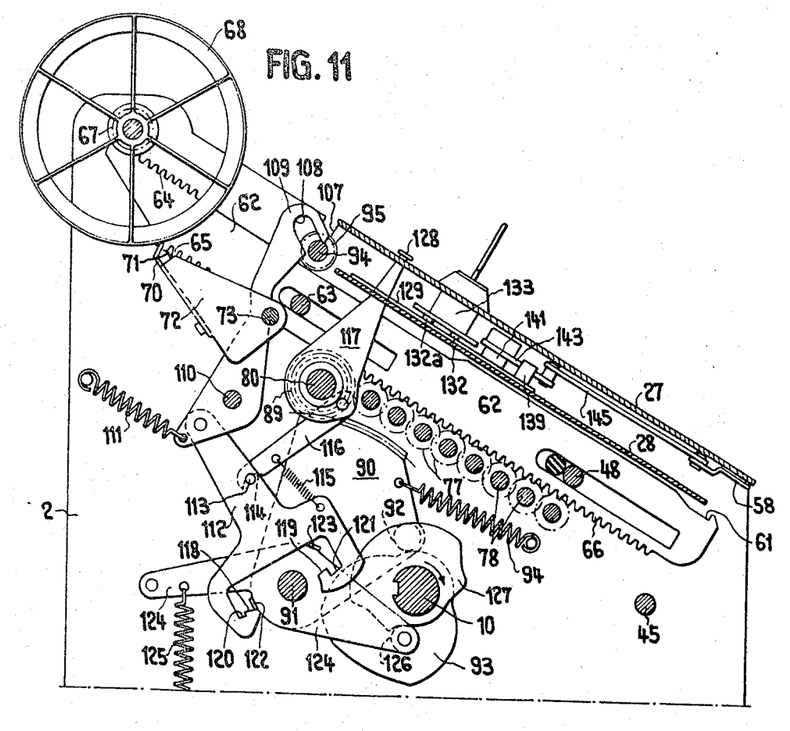
FIG. 11 is a section along line XI—XI in FIG. 3.
Figure 14:
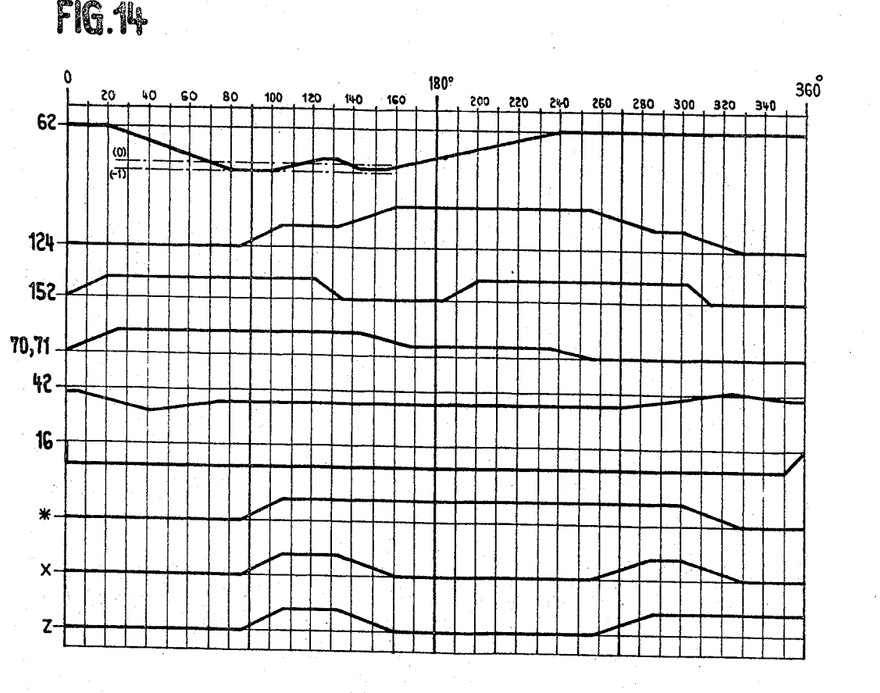

When all desired keys have been operated the start key 25 is depressed whereby the main cam shaft 10 of the cash register executes one full rotation in the direction of the arrows shown in FIGS. 1, 4 and 11, whereas the wheel 11 executes two full rotations. The duration of the operating cycle is indicated in FIG. 14 by the position of contact 16. At the beginning of the rotation of wheel 11 the cam 147 lifts the lever 150 so that the slide 152 is shifted to the left (FIG. 2) and downwardly in FIG. 9, so that the lugs 153 are spaced from the arms 106 of the stop latches 101. This movement is indicated in FIG. 14. At the same time the recoil stop 70, 71 is completely disengaged by rotation of the cam disc 74 of the main shaft 10 so that all stop bars 62 may freely be displaced. Shortly after the beginning of the cycle cam disc 344 allows a swinging motion of lever 44 and of the release bar 42 coupled therewith into an extreme outer position (lowest position in diagram FIG. 14) whereby all control bars 34 which have not been displaced to their lower locking position by depression of an associated key are now pulled downwards into the locking position by their hooks 40 engaging into the windows 41 of the release bar 42. All the keys are herewith locked in their inoperative position so that no key may be actuated during the operating cycle of the machine. Partially depressed keys 29 are completely pulled down by the teeth 36 of the control bar 34 engaging the upper flanks of teeth 35 of the keys. By the said displacement of all control bars 34 into their lower locking position, all the associated zero stops 53, 54 are also disengaged, but these zero stops must not remain disengaged in such decimals where no key has been operated. Therefore, as shown in FIG. 14, the release bar 42 is now returned by a predetermined amount. The control bars 34 maintained in their lower locking position by a depressed key cannot follow this return motion and their hooks 40 slightly compress the associated springs 46. The other control bars 34 are shifted back into an intermediate position for which they still lock the associated keys in the inoperative position, but they allow reengagement of the zero stops into their operating position. When the above preliminary operations have been terminated, the toothed segment 90 starts to rotate in clockwise direction (FIGS. 4 and 11). The driving cams 85 and 86 of the driving disc 84 which have usually been disengaged from the recesses 81 and 82 again engage into such recesses sooner or later according to the previously adjusted end position of the associated stop bar 62 whereby the driving wheels 79 start to rotate with the shaft 80. It is assumed that all stop bars 62 are in their position corresponding to the value zero so that the above coupling of the driving wheels 79 and of the stop bars with the driving shaft 80 occurs in this zero position. As indicated in FIG. 14 the driving shaft 80 now executes a rotation into a position corresponding to the value —1 so that all the stop bars 62 are positively returned into a position corresponding to the value —1. For this lower end position of the stop bars the toothed racks 97 are usually maintained in a position corresponding to the value zero by abutment of their tooth 99 against the lug 100 of the associated stop latch 101. This relative position of the stop bar 62 and the toothed rack 97 attached thereto is shown in FIGS. 8 and 9 wherein the rack 97 has remained behind the stop bar by one unit step whereby the spring 98 has been extended by this distance. If, as assumed above, all stop bars 62 have initially been in their zero position, the toothed racks 97 will not be displaced during the return movement of the stop bars into the position —1, and consequently, the counting wheels which are engaged with the toothed racks in this phase of the operating cycle as indicated in FIG. 14 by the lower position of the line with the reference (*) are not moved accordingly.

As shown in FIG. 14, the counting wheels are now disengaged, this being indicated by the ascending portion of the line showing the movement of the counting register for item addition (*). Disengagement of the counting wheels is controlled by rotation of the lever 124 in clockwise direction by a first amount. Thereby the surface 118 of lever 112 follows the lug 122 of lever 124 so that the lever 112 is shifted to the left (FIG. 11) by the spring 111 acting on lever 109. The lever 109 is thus rotated in clockwise direction whereby the shaft 94 of the counting register is lifted and the counting wheels 95 are disengaged from the racks 97 and are applied against the upper edge 27a of the upper key-board plate 27 for maintaining these wheels in a predetermined position.

The stop bars 62 are now advanced from their retracted position corresponding to the value —1 into a position corresponding to a value slightly above zero (FIG. 14). When the stop bars are in this position the slide 152 is returned to its initial locking position wherein all the stop latches 101 are maintained in their operative position shown in FIG. 9. The stop bars 62 are now returned into a position slightly below zero position whereby the toothed racks 97 are adjusted exactly into their zero position determined by abutment of their tooth 99 against the lugs 100 of the stop latches 101.

As shown in FIG. 14 the lever 124 is now further rotated in clockwise direction (FIG. 11). However, its lug 123 does not touch the surface 119 of lever 112 but enters into the recess 121 so that the rotation of lever 124 is without effect for lever 112. The counting register thus remains disengaged as shown in FIG. 14.

The stop bars 62 are now advanced, this being controlled by rotation of the toothed segment 90 in clockwise direction and rotation of the driving shaft 80 in anticlockwise direction, whereby the driving cams 85 and 86 abut against the inclined end surfaces 81a and 82a of the recesses 81 and 82 of the driving pinions 79 so that these pinions and the stop bars 62 gearing therewith are driven until one of the stops 69 abuts against a stop tongue 33 of a depressed key. Now, the driving cams 85 and 86 of the driving discs 84 are disengaged from recesses 81 and 82 by the wedging action of end surfaces 81a and 82a and slide on the face of the driving pinions 79 until the rotation of the driving shaft 80 is terminated. In decimals where no key has been depressed the stop bar 62 is blocked in its zero position by a zero stop 53, 54. When the stop bars 62 are advanced the numeral wheels 68 are adjusted to the indicating position corresponding to the depressed key. Due to the elasticity of the numeral wheels high accelerations of the stop bars and consequently adjustment at a high speed is possible, but it is necessary to provide recoil stop means due to the rigid coupling between the stop bars 62 and the numeral wheels 68 and due to the non-rigid coupling between the driving discs 84 and the driving pinions 79 for the stop bars 62. As shown in FIG. 14 the recoil stop 70, 71 is engaged to such an extent during the advance of the stop bars that the springs 71 engage into the toothing 65 of the stop bars 62. The springs 71 are so designed that they do not substantially hinder the advance of the stop bars, but recoil movement of the stop bars is prevented. When the stop bars are advanced the recoil stop is completely engaged so that the free edge of plate 70 engages into the toothing 65 of the stop bars whereby the stop bars are blocked in the adjusted position. The stop bars 62 and numeral wheels 68 remain in the so adjusted position until the stop bars are returned during the first phase of the next operating cycle of the cash register.

As schematically shown in FIG. 14 the release bar 42 is swung in clockwise direction towards the end of the cycle to such an extent that all control bars 34 are returned into their inoperable initial position whereby the depressed keys 29 are released by the associated locking tooth 36 of the bars 34 and are returned into the inoperative upper position by the control surface 38 of the control bar 34. The release bar 42 is then returned into its initial position shown in FIG. 4 wherein the control bars 34 are maintained in their inoperative initial position by springs 46.

As equally shown in FIG. 14 the slide 152 is actuated two times per operating cycle so that stop latches 101 which may accidentally have left their rest position due to shocks and vibration during the adjustment of the stop bars and numeral wheels are returned into their rest position. As further indicated by FIG. 14, the driving lever 124 is returned into its initial position towards the end of the operating cycle, whereby its lug 122 abuts against the control surface 118 of lever 112 which is pulled towards the right and downwards in FIG. 11. The lever 109 is thereby rotated in anticlockwise direction into the position shown in FIG. 11 and the counting register is engaged. It is obvious from the foregoing that the counting register is disengaged during the advance of the stop bars 62 so that the amount or item entered by the keys 29 is not added during the same operating cycle but only during the next as will be explained below.

During the next operating cycle the operations explained above take place, whereby all the stop bars 62 are first returned while the counting register is engaged. As explained above, the stop teeth 99 of the toothed racks 97 abut against the lugs 100 of the stop latches 101 when the position "zero" is reached. However, when the tooth 96 of a counting wheel 95 engages the outer flank of the tooth of arm 106 of the associated stop latch 101 this stop latch is pressed downwards and its rest 103 is disengaged from the opening 104 so that the stop latch is rotated in anticlockwise direction (FIG. 9) by the spring 105. By this rotation of the stop latch, its stop lug 100 is removed from the path of the stop tooth 99 of the toothed rack 97 of the next higher decimal so that this toothed rack is displaced together with its stop bar 62 into a position corresponding to a value of —1. In this manner the tens are transmitted, that is, whenever a tooth 96 of a counting wheel 95 engages the free end of the arm 106 of the associated stop latch 101 during the forward displacement of stop bars 62 this stop latch is disengaged into inoperative position and allows addition of an extra unit in the next higher decimal.

The remaining operations for item addition are as described above. It may be repeated that the stop latches 101 are returned into their inoperative rest position before the new adjustment of the stop bars 62, and a second return or reset movement of the slide 152 occurs for safety purposes after adjustment of the stop bars 62. When the stop bars 62 are returned at the beginning of the operating cycle, zero stops 53, 54 brought into their lower operative position as explained above by depression of a key 29 are lifted into the notch 61 by an inclined end surface 62a of the stop bars 62.

When a wrong key 29 is depressed by error it is not possible to correct the error by simply depressing another key of the decimal, because all the other keys are locked by the control bar 34 as explained above. However, the correction key 50 may be depressed whereby the release bar 42 is brought into its release position through levers 47 and 43 whereby all keys already depressed are released and selection may be repeated.

Figure 3:
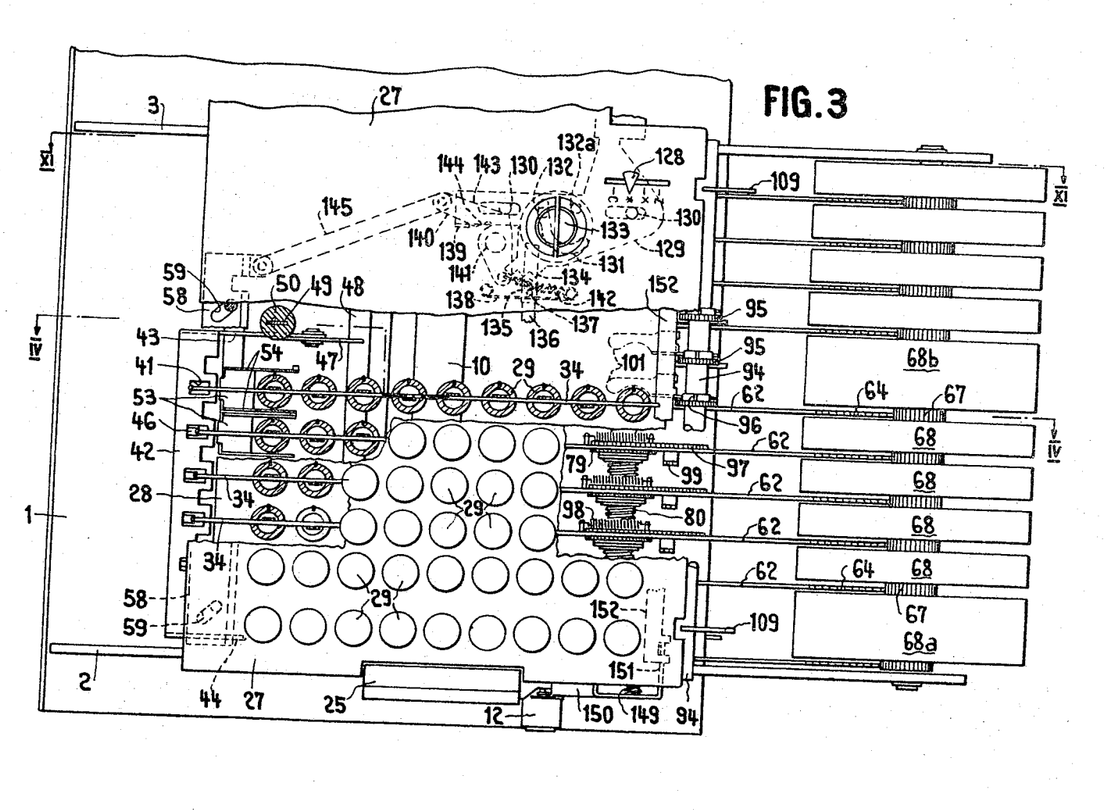
FIG. 3 is a top view of the key board and the indicating means of the cash register, partially in section.

The other operating cycles substantially distinguish from item addition only by the operation of the counting register. When forming a sub-total the previously registered amount or item has to be added and the sum has to be formed and indicated. For preselection of the operation "sub-total" the lock 133 has to be turned in anticlockwise direction into its next position wherein the slide 129 is displaced into a position at which the pointer 128 of the lever 117 is on position "X." When forming a sub-total, no new item or amount must be typed and therefore, the keys 29 are locked. When the slide 129 is shifted by one step towards the right (FIG. 3) the lever 143 is rotated in clockwise direction by the lug 139 of slide 129 contacting the surface 140 of lever 143, whereby the locking slide 58 is shifted upwards and to the left in FIG. 4 and all control bars 34 are locked in their initial position so that no key 29 may be depressed into operative position. By the above displacement of the locking slide 58 all zero stops 53, 54 are lifted into inoperative position by engagement of the slide 58 below the control surfaces 56.

By the above displacement of the slide 129 the lever 117 is rotated in anticlockwise direction (FIG. 11) so that the lever 116 is lifted (FIG. 11). In spite of this displacement of lever 116 the lever 112 is not yet displaced due to braking action of lug 122 contacting the control surface 118.

Under these circumstances the counting register remains engaged as illustrated in FIG. 14 by diagram X and is then disengaged in the same phase of the cycle as during item addition, because at the beginning of the rotation of lever 124 in anticlockwise direction its lug 122 resting on the surface 118 releases the lever 112 and allows rotation of the lever 109 under the action of spring 111. The lever 112 now follows the displacement of the lever 116 because its pin 113 falls into the rest 114. Shortly later the lug 123 of lever 124 abuts against the surface 119 of lever 112 during the further rotation of lever 124 in clockwise direction whereby the lever 112 is again pulled to the right and downwards in FIG. 11 and the lever 109 is swung back into the position shown in the drawing and the counting register is engaged. Engagement of the counting register is terminated when the stop bars 62 advance through the position "zero," that is, before the toothed racks 97 are displaced by the stop bars. The counting wheels 95 now coupled with the advancing toothed racks 97 are rotated in clockwise direction (FIGS. 4 and 8) until the tooth 96 of each counting wheel 95 abuts against the rear steep flanks of the teeth of arms 106 of the stop latches 101. These rear flanks of the teeth or hooks of the arms 106 are so designed that the stop latches are not disengaged from their rest position so that the rotation of the counting wheels is stopped. In this way all the toothed racks 97 and all the stop bars 62 will advance until the tooth 96 of the associated counting wheel 95 stops this advancing movement by abutment against the tooth or hook of arm 106, whereby the total amounts summed up in the calculating register are adjusted and indicated. The toothed racks 97 and stop bars 62 remain in this indicating position until the stop bars 62 are returned during the first phase of the next operating cycle. When the next operation is item adding as will usually be the case, the adjusted and indicated sub-total is again transmitted into the calculating register since the counting wheels are engaged with the returning stop bars 62 during the first phase of the next operating cycle and the item or amount typed during this next cycle will be added during the following cycle.

For forming and indicating a total, the slide 129 is shifted further to the right by rotation of the lock 133 in anticlockwise direction so that the pointer 128 of the lever 117 now points at position Z. The lever 143 is not displaced when changing from "sub-total" adjustment to "total" adjustment because the lug 139 of the slide 129 enters into the notch 144 of lever 143. The locking slide 58 is in its operative locking position for which the control bars 34 are locked in their inoperative initial position and for whch the zero stops are disengaged.

The lever 117 is further rotated in anticlockwise direction (FIG. 11) so that the lever 116 with its rest 114 is lifted (FIG. 11). For the reasons set out above under "sub-total" the lever 112 does not follow the preselecting displacement of lever 116 so that the calculating register remains engaged during the first phase of the operating cycle as explained above for item addition and the previously entered item or amount is added into the calculating register during the reset displacement of the stop bars 62. When the driving lever 124 starts to rotate in clockwise direction after the reset movement of the stop bars 62, the lever 112 is released by the lug 122 as explained above whereby the lever 109 is now rotated for disengaging the counting wheels. The lever 112 now follows the preliminary adjustment of the lever 116. As explained above in connection with the forming of a sub-total, the lug 122 of lever 124 abuts against the surface 119 of lever 112 during the further rotation of lever 124 for reengaging the calculating register during the advance of the stop bars as shown in FIG. 14. In the manner explained above the total amount contained in the calculating register is now indicated. When the driving lever 124 is returned in anticlockwise direction towards the end of the operation cycle, the lug 122 of this lever engages into the notch 120 of the lever 112 which is maintained in its upper extreme position by the rest 114 of lever 116 whereby the lever 112 is maintained in this upper extreme position independently of any later adjustment of lever 116 and of its rest 114. The depth of the notch 120 is so designed that the lever 112 is not actuated by the engagement of lug 122 into said notch so that the calculating register remains disengaged as indicated in FIG. 14 by the diagram Z illustrating the operation of the calculating register during the total-taking cycle.

During the next operating cycle, usually an item-adding cycle, the lever 112 first remains in its upper extreme position due to the engagement of lug 122 into notch 120 and does not follow any downward displacement of lever 116 and its rest 114 effected by the preselection of the next operating cycle. During this next operating cycle the calculating register first remains disengaged during the reset operation of the stop bars 62 so that all the counting wheels remain in the zero position into which they have been brought during the total-taking operation. The calculating register is thus reset to zero. When the lug 122 of lever 124 is disengaged from the notch 120 of lever 112 during the anticlockwise rotation of lever 124, the lever 112 follows the preselected position of lever 116 and its rest 114, for instance into the position shown in FIG. 11 corresponding to item addition. The calculating register thus remains disengaged and is only engaged towards the end of the operating cycle as shown in FIG. 14 for item addition in order that the entered item or amount may be transmitted into the calculating register at the beginning of the next operating cycle.

It is often desired to indicate an amount but not to add it into the calculating register. For this purpose another position C is provided for which the lever 117 is shifted into an extreme position in clockwise direction. Consequently the lever 116 is brought into an extreme lower position in FIG. 11 so that the lever 112 is further rotated in clockwise direction in FIG. 11. Both control surface 118 and 119 are removed from the path of the lugs 122 and 123 so that the calculating register continuously remains disengaged and no calculating operations occur. During the next operation, usually an item-adding operation, the lever 112 cannot immediately return into the position shown in the drawing in spite of the preliminary adjustment of levers 117 and 116 and rest 114, because the lower arm of lever 112 is supported by lug 122 at the inner side of its hook-shaped end so that lever 112 will only follow into the preselected position of lever 116 when the lever 124 is rotated in clockwise direction during the first phase of the following operating cycle. The calculating register is thus only engaged towards the end of the operating cycle for adding the entered item during the first phase of the next operating cycle.

Except for positions C*XZ the lock 133 has another position for completely locking the cash register. For this purpose the lock is brought into its end position in anticlockwise direction, this end position being determined by abutment of the pin 132 to the end of the slot 133 of the slide 129. For this end position the pin 132a of the lock has engaged the one end of the locking rod 136 and has shifted this rod into its locking position. The start key 25 is blocked and cannot be operated for starting an operating cycle. In this connection it should be pointed out that the locking rod 136 is temporarily shifted into its locking position by the rest toothing 134 of slide 129 whenever the slide 129 passes from one selecting position to another so that the cash register cannot be operated during a preselecting operation.

What is claimed:

1. A calculating and indicating device, particularly for a cash register, comprising stop bars having stops adapted for abutment against stops of a keyboard thereby determining the adjustment of the stop bars, at least one indicating device and one calculating device operable by said stop bars, said stop bars being continuously coupled with numeral wheels of the indicating device, each numeral wheel being always held in a position corresponding to the position of the associated stop bar, and said stop bars remaining in the indicating position of the last operating cycle of the machine between succeeding operating cycles of the machine.

2. A device according to claim 1, comprising a counting register engageable with and disengageable from said stop bars, a first phase of each operating cycle of the machine during which said stop bars are returned from their indicating position, said counting register being engaged for item adding between succeeding operating cycles of the machine and during said first phase of each operating cycle.

3. A calculating and indicating device, particularly for a cash register, comprising stop bars adapted for adjustment to positions determined by stops of a keyboard, at least one indicating device operable by said stop bars, said stop bars being continuously coupled with numeral wheels of the indicating device and said stop bars remaining in the indicating position of the last operating cycle of the machine between succeeding operating cycles of the machine, a toothed bar displaceably mounted on each stop bar by one unit step of the stop bar, a spring attached to and acting onto each of said toothed bars in the reset direction of the stop bars, a counting register having counting wheels, each of said counting wheels adapted for being engaged with and disengaged from one of said toothed bars, stop latches for said toothed bars having an operative and inoperative position, operative stop latches being adapted to retain said toothed bars in a zero position upon return displacement of said stop bars, rest means for each of said stop latches for maintaining said stop latch in its operative position, a spring acting onto each of said stop latches for producing the rest pressure and tending to displace the stop latch from its operative rest position into its inoperative position, each of said counting wheels having a tooth operable for disengaging the associated stop latch from its rest when the counting wheel is in its ten-transmitting position.

4. A device according to claim 3, comprising an actuating tooth on each of said stop latches, said actuating tooth extending into the path of said tooth of the associated counting wheel, said operating tooth having a first flank adapted to be engaged by said tooth of the counting wheel during adding rotation of the counting wheel in a first direction for disengaging the stop latch from its rest, and a second flank on said actuating tooth forming a stop for said tooth of the associated counting wheel during subtracting rotation of the counting wheel in a second direction.

5. A device according to claim 3, comprising a single reset bar for all stop latches.

6. A calculating and indicating device, particularly for a cash register, comprising stop bars adapted for adjustment to positions determined by stops of a keyboard, at least one indicating device and one calculating device operable by said stop bars, said stop bars being continuously coupled with numeral wheels of the indicating device and said stop bars remaining in the indicating position of the last operating cycle of the machine between succeeding operating cycles of the machine, a zero stop for each of said stop bars, each of said zero stops being held in a disengaged position by a control bar when a key is operated, a control slide having an operative position wherein all control bars are locked in their rest position and all zero stops are in their inoperative disengaged position, a mechanism for preselection of calculating operations such as "item addition," "sub-total," "total" and "non-addition," said control slide being operable by said preselecting mechanism and being maintained in its locking position for the operations "sub-total" and "total," a selector lever controlling the position of a control lever for the counting register, said control lever being coupled with said selector lever by means of an elastic coupling, for instance a spring-loaded rest.

7. A device according to claim 6, wherein said control lever is operable by a driving lever having driving members adapted for displacement in opposite directions and for cooperation with associated control surfaces of the control lever, said control surfaces having limited length in the direction of the adjusting movement of the control lever.

8. A device according to claim 7, comprising a rest or initial position wherein a first control surface engages its associated driving member whereby the counting register is maintained in its engaged position and prevents following-up of the control lever to the preselecting motion of the selector lever.

9. A device according to claim 7, wherein a second control surface of the control lever is within the operating range of the second driving member for "sub-total" and "total" adjustment, the counting register being engaged for total taking when the second driving member engages said second control surface.

10. A device according to claim 9, wherein said control lever has a recess at the side of its first control surface, the associated driving member engaging into said recess when the control lever is in its "total" position, whereby the control lever is maintained in this position for which the counting register is disengaged independently of the preselector adjustment for the next operation.

11. A calculating and indicating device, particularly for a cash-register, comprising stop bars adapted for adjustment to positions determined by stops of a keyboard, at least one indicating device and one calculating device operable by said stop bars, said stop bars being continuously coupled with numeral wheels of the indicating device and said stop bars remaining in the indicating position of the last operating cycle of the machine between succeeding operating cycles of the machine, a recoil stop including a toothed bar on each of said stop bars and a leaf spring engaging said toothed bar, all leaf springs being mounted on a carrier pivotably mounted for engagement and disengagement of said leaf springs.

12. A calculating and indicating device, particularly for a cash register, comprising stop bars having stops adapted for abutment against stops of a keyboard thereby determining the adjustment of said stop bars, at least one indicating device and one calculating device operable by said stop bars, said stop bars being continuously coupled with numeral wheels of the indicating device so that each numeral wheel is always held in a position corresponding to the position of the associated stop bar, and said stop bars remaining in the indicating position of the last operating cycle between succeeding operating cycles, control means operable for returning said stop bars at the beginning of each operating cycle, said stops of the keyboard comprising leaf springs flexible in a direction transversely to the displacing direction of the stop bars.

References Cited

UNITED STATES PATENTS

| | | | |
|---|---|---|---|
| 1,812,020 | 6/1931 | Robertson | 235—23 |
| 1,896,936 | 2/1933 | Bornkessel et al. | 235—23 |
| 1,899,140 | 2/1933 | Dunning | 235—23 |
| 2,954,158 | 9/1960 | Jackson et al. | 235—8 |

RICHARD B. WILKINSON, *Primary Examiner.*

J. G. MURRAY, *Examiner.*